(No Model.) 2 Sheets—Sheet 2.
T. H. DAY.
MACHINE FOR MAKING ICE AND PRODUCING COLD.
No. 285,879. Patented Oct. 2, 1883.

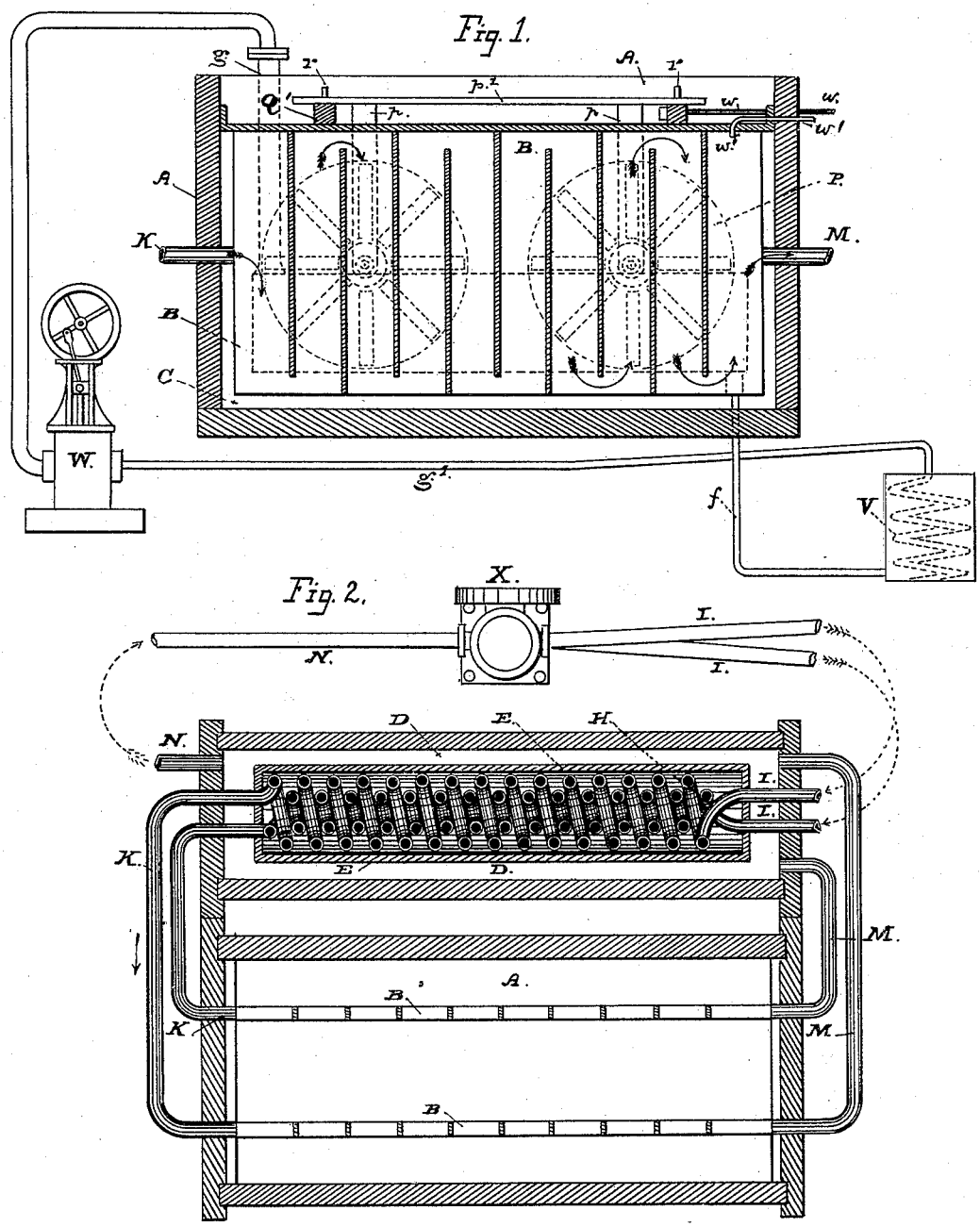

Witnesses:
G. A. Dickson
L. R. Mabie

Inventor:
Thomas H. Day,

By his Atty., Edw. J. Osborn

UNITED STATES PATENT OFFICE.

THOMAS H. DAY, OF SAN FRANCISCO, CALIFORNIA.

MACHINE FOR MAKING ICE AND PRODUCING COLD.

SPECIFICATION forming part of Letters Patent No. 285,879, dated October 2, 1883.

Application filed January 10, 1883. (No model.)

*To all whom it may concern:*

Be it known that I, THOMAS H. DAY, a citizen of the United States, residing in the city and county of San Francisco, State of California, have made and invented certain new and useful Improvements in Machines for Making Ice; and I do hereby declare that the following is a full, clear, and exact description of the same, reference being had to the accompanying drawings.

My invention relates to improvements in machinery or apparatus for the manufacture of ice and the production of a cold atmosphere for refrigerating purposes; and the said improvements consist, first, in certain novel means of handling and circulating a refrigerating liquid which is applicable to machines or apparatus wherein a freezing-liquid—such as glycerine—is reduced in temperature by the action upon it of a volatile liquid, and constitutes, when thus reduced, the refrigerant or medium to freeze the water or to produce the required degree of cold. The result sought to be obtained by this feature of my invention is the more economical and effective action of the volatile liquid upon the refrigerant, and the consequent production of ice at less cost; and, secondly, it consists in means for breaking up and dispersing air-globules that accumulate in the water during the progress of its conversion into ice; the object of this part of my invention being to preserve as nearly as possible the equilibrium or normal condition of the water, and thereby obtain a clear, tough quality of ice.

The following description fully explains the nature of my said improvements and the manner in which I proceed to construct, apply, use, and operate them, the accompanying drawings being referred to therein by figures and letters.

Figure 3:
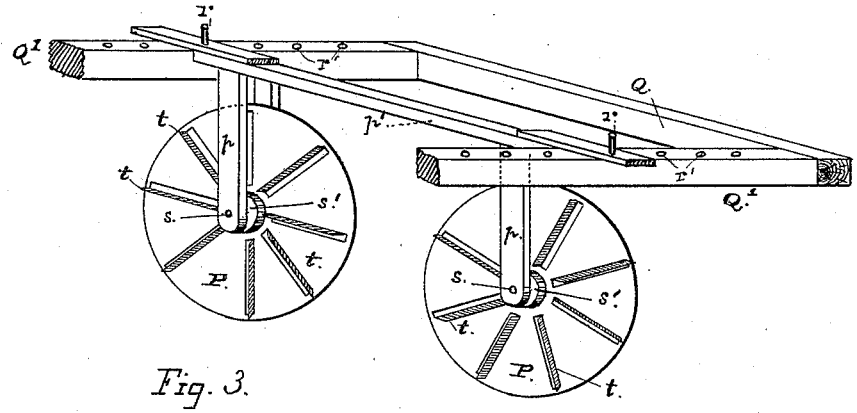
Figure 4:
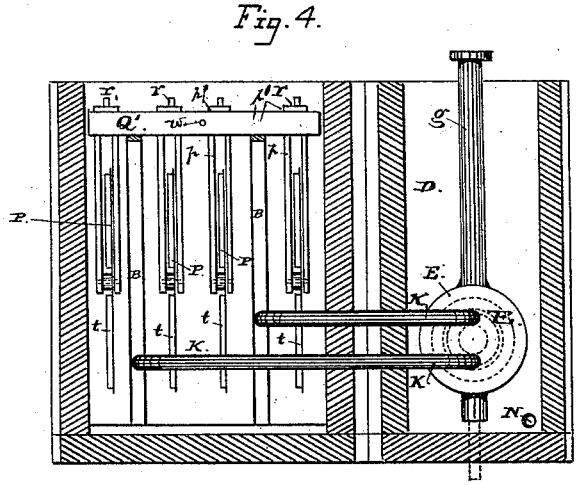

In the said drawings, Figure 1 is a vertical section taken longitudinally through an apparatus having two freezing cells or plates. Fig. 2 is a plan or horizontal sectional view of Fig. 1. Fig. 3 is a detail view of the agitators and their supporting and operating frame. Fig. 4 is a vertical transverse section through Fig. 1 at about the center, showing the manner of suspending the agitators in the freezing-tank.

A represents a suitable water-tight tank in which the operation of freezing is carried on. Such a tank is common to all ice-machines wherein the ice is formed upon the sides of hollow cells or plates that are immersed in a body of water in the tank, and on the outside surface of which the ice is formed and deposited by the action of a circulating refrigerant within the plate.

B B are a number of freezing plates or cells, of any desirable form and construction. Each plate has a narrow chamber or channel, $c\,c$, extending down the two ends and under the bottom edge, into which water at a higher temperature than the formed ice can be caused to circulate after the freezing is finished, for the purpose of heating the sides of the cell sufficiently to loosen the ice in a solid block. The space in each plate has an outlet communicating with the outside atmosphere, in order to prevent undue amount of pressure in the cells and prevent bursting or collapsing. This outlet is a small tube, $w$, leading out from the top.

D is a second tank, or a compartment formed from the freezing-tank by a separating-partition, and containing the refrigerator, or that vessel or chamber in which the volatile liquid is held and applied to cool the refrigerant.

E is the refrigerator, consisting of a long cylindrical chamber laid in horizontal position, containing coils of pipe H H, and connected with the condenser V by an inlet-pipe, $f$, and with the vacuum-pump by a pipe, $g$. Within this chamber, around the coils, the cooling-liquid is volatilized and circulated in the usual manner. Figs. 1 and 2 of the drawings illustrate this construction and arrangement. The coils H hold the refrigerant or a non-freezing liquid—such as glycerine—and they are connected at one end by pipes I I with a circulating-pump, X, and at the opposite end to the plates or cells B by conducting-pipes K K. The liquid, in its passage through the coils, is reduced in temperature, and enters the freezing-cells through these pipes K; but, instead of returning it directly to the coils, I now discharge it from each plate into the tank D by means of a pipe, M, and then connect the tank with the circulating-pump X by a pipe, N. The freezing-liquid therefore passes through the tank and around the cylindrical refrigerator after having performed its work in the freezing-cells, and the cold thrown off by the outer surface of the chamber, and that would otherwise escape and be lost, is thus utilized to remove from the liquid the heat absorbed by circulating through the cells. This chamber E is placed and supported in the tank D in such manner that the freezing-liquid passes around and is in contact with it on all sides. In causing the refrigerant or freezing-liquid to circulate against the outside surface of the refrigerating-chamber in such machines I accelerate the general operation, and thereby effect a gain in the quantity of ice produced during a given period of operation, and at the same time greatly reduce the running expenses.

I provide a wheel or disk, P, having a number of radial floats or blades upon its surface, and suspended from a frame or carrriage, Q, above the cells or freezing-plates, upon axles or center-pins, in such manner that the disk or the greater part of its surface is immersed in the water of the tank. To the carriage Q a reciprocating motion is imparted by suitable mechanism, so that the disk P is propelled back and forth, and at the same time caused to revolve upon the center, the result of which movements in the water is to break up and disperse the air-globules thrown off by the freezing process, and thereby to restore the water not frozen to as nearly as possible its normal condition. Such condition is necessary in order to insure uniform density and clearness of the ice being formed, and to produce a marketable article of the desired solidity and toughness. These "rotary agitations," as I term them, are shown in Figs. 3 and 4 of the drawings, and as therein constructed and applied two of them are mounted or suspended by means of hangers $p$ $p$ from a bar, $p'$, the outer ends of which bar rest upon the end timbers, Q', of the reciprocating frame Q. By means of short pins $r$ $r$, that take through the ends of this bar and into holes in the timber Q', the disks P are held in position within this frame in line with each other. The axles S pass through in loose bearings or enlarged openings $s'$ in the center of the disk, and the resistance of the water against the lower portion of the disks as the frame is moved back and forth is sufficient to turn them upon the centers S'. There are two pairs of such disks P to each freezing-cell B, and they are suspended from the frame Q, so that the cell has one pair operating at and alongside of each face or freezing-surface. By providing holes $r'$ at intervals apart along the tubes Q', the bars $p$ can be shifted in position and set farther away from the cell, in order to bring the disks away from the face of the forming ice and keep them always in the outside water. These disks are simply and cheaply formed from a metal plate by cutting a number of radial slits in the face and then making a short rectangular cut at each end, so that the portion of metal inclosed between these cuts, as at $t$, Fig. 3, can be bent to stand out at right angles with the disk. These bent-out strips $t$ $t$ give a number of radial blades, that serve as floats or striking-surface. The frame Q rests upon and moves over the top of the cells, and by connecting to it at one side the end of a pitman, as at $w$, Figs. 1, 4, the required reciprocating motion can be obtained by attaching the pitman to a crank-shaft driven from the engine that works the pumps.

In applying this mode of handling and circulating the uncongealable liquid to the production of a cold atmosphere in a room or a refrigerating-chamber, I substitute for the freezing cells a simple corrugated plate of iron, which I suspend at the top of the chamber in a position nearly horizontal, but having a pitch or inclination toward one side, so that, the refrigerating-liquid being discharged upon the higher end, it will flow down and over the whole surface, filling the corrugations and passing off at the lower side or end of the plate. The circulation of the liquid will then be the same as in the first-described construction; but the cell will be an open one, in order to bring the air to be cooled into direct contact with the refrigerant.

The advantage of using a corrugated plate will be that when the operation is suspended and the flow of the fluid is stopped the bottoms of the corrugations will serve as so many pockets to retain a quantity of the refrigerating-liquid for keeping the temperature of the air as low as possible after the apparatus has ceased to act.

Rotating or rocking agitators have heretofore been used; but the construction of the wheel is different from mine, and they do not have a reciprocating and rotating motion combined imparted to them.

Having thus fully described my invention, what I claim, and desire to secure by Letters Patent, is—

1. In the process of producing cold and making ice, which includes the use of an incongealable liquid cooled by circulation in pipes or conductors through a volatile refrigerating fluid or liquid and applied within freezing cells or plates, the herein-described method of carrying and circulating the incongealable liquid, which consists in taking the said liquid from the refrigerating-chamber to the freezing-plates, and from thence discharging it into a tank within which the said refrigerating-chamber is immersed, and from said tank drawing off the said liquid and returning it to the refrigerating-chamber or into the general circulation for use again, substantially as hereinbefore set forth.

2. In an ice-machine, the combination, with freezing-cells B B, of a refrigerator-chamber located in and surrounded by a tank, the pipes K K, for introduction and circulation of the cooled freezing-liquid from the refrigerator to the freezing-cell, and the connection of said cell with the tank surrounding the refrigerator, whereby the freezing-liquid is discharged from said cells into the tank and in contact with the outside surface thereof, and a circulating-pump or means for returning the liquid from the tank into the general circulation again, substantially as hereinbefore set forth.

3. In an ice-machine, the combination, with the refrigerating-chamber D, having the incongealable freezing-liquid carried through it, as described, of the receptacle surrounding the said chamber, and connected with the freezing cells or plates by conductors through which the said liquid is discharged into said receptacle before being introduced into the general circulation again, substantially as hereinbefore set forth.

4. In an ice-machine, the combination together of a refrigerating-chamber, D, pump and condenser, a refrigerating-coil, pump, and conductor to contain and conduct incongealable freezing-liquid, the freezing-cells in the general circulation of said liquid, and a tank surrounding the refrigerating-chamber and interposed in the circulation of the freezing-liquid, so that in passing from the freezing-cells the said liquid is carried through the tank before it re-enters the refrigerating-coils, substantially as hereinbefore set forth.

5. An agitator for an ice-machine, consisting of a disk of sheet metal having cuts or slits formed therein, and the metal cut to make the cuts or slits turned out to form wings, as shown and described.

6. An agitator consisting of a rotating disk or wheel, or series thereof, having imparted to it a reciprocating motion, substantially as herein set forth.

7. The combination together of the frame Q, having a reciprocating motion, the bars $p\ p$, having hangers to receive the axles of the rotary disk P, and means for setting and holding the bars $p$ in position at greater or less distance apart, for operation substantially as hereinbefore set forth.

THOS. H. DAY.

Witnesses:
 EDWARD E. OSBORN,
 GEO. A. DICKSON.